April 8, 1924.
A. G. WEBSTER
OBSERVING AND RECORDING THE OPERATION OF ORDNANCE
Filed April 7, 1919    4 Sheets-Sheet 2
1,489,566
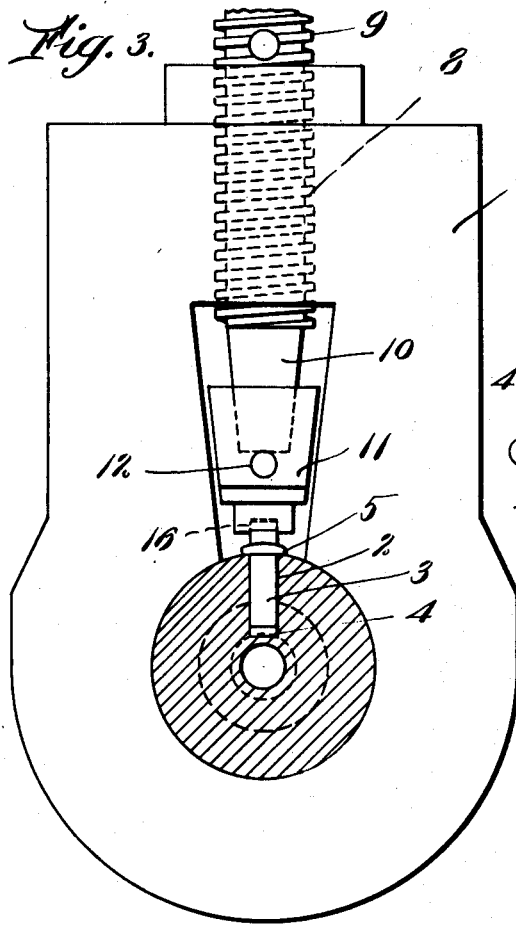
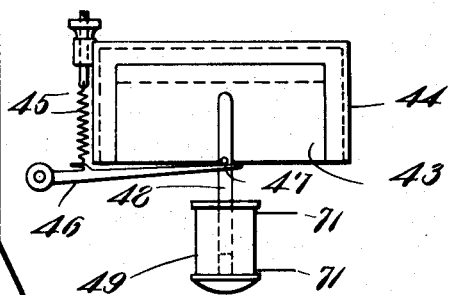
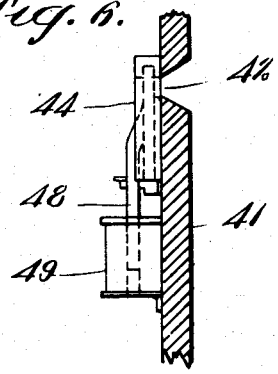
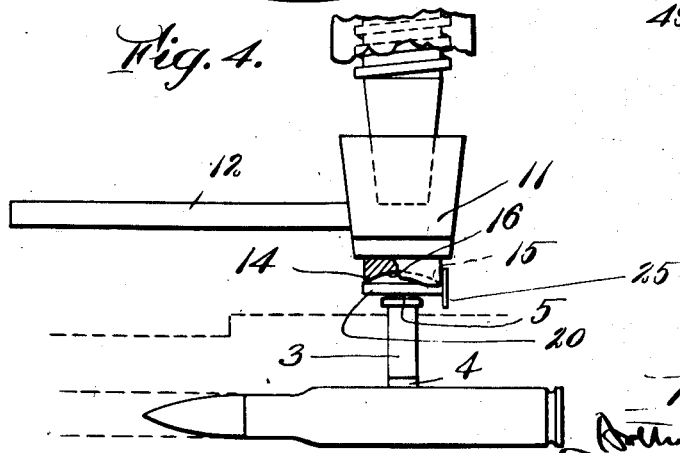

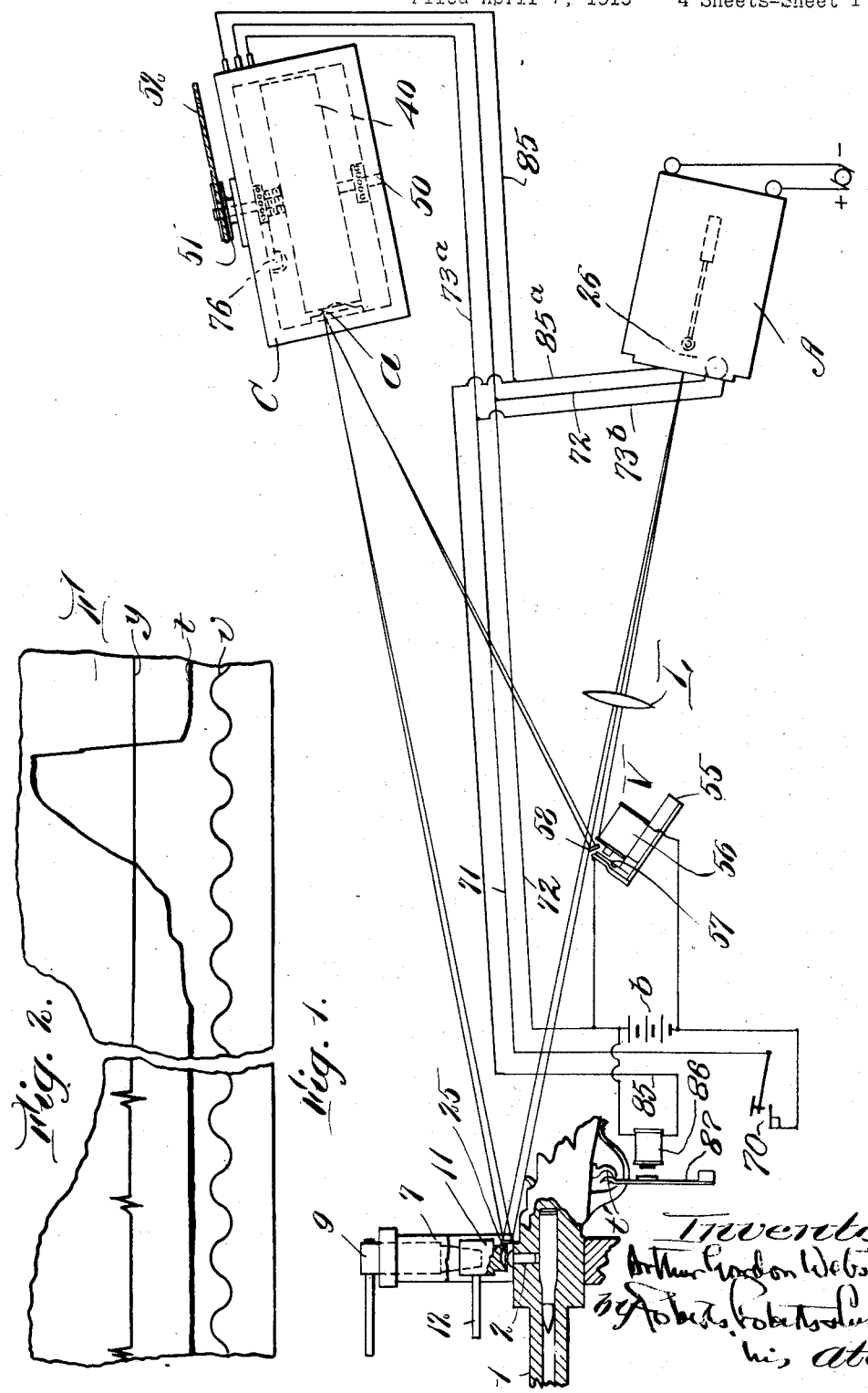

April 8, 1924.
A. G. WEBSTER
OBSERVING AND RECORDING THE OPERATION OF ORDNANCE
Filed April 7, 1919   4 Sheets-Sheet 3
1,489,566
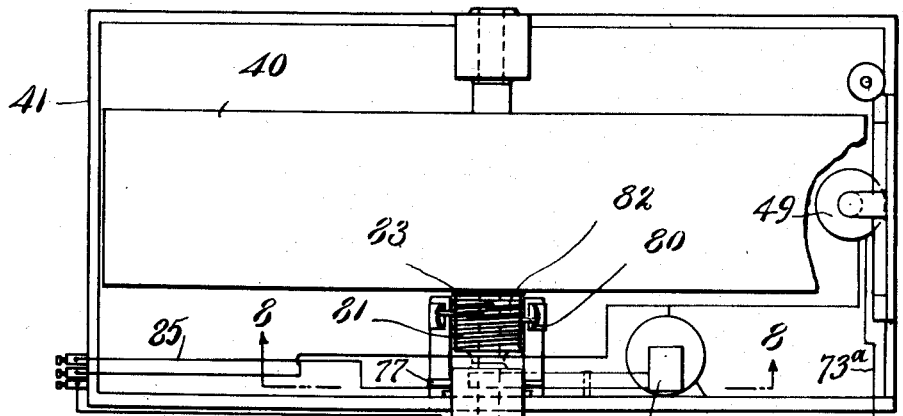
Fig. 7.
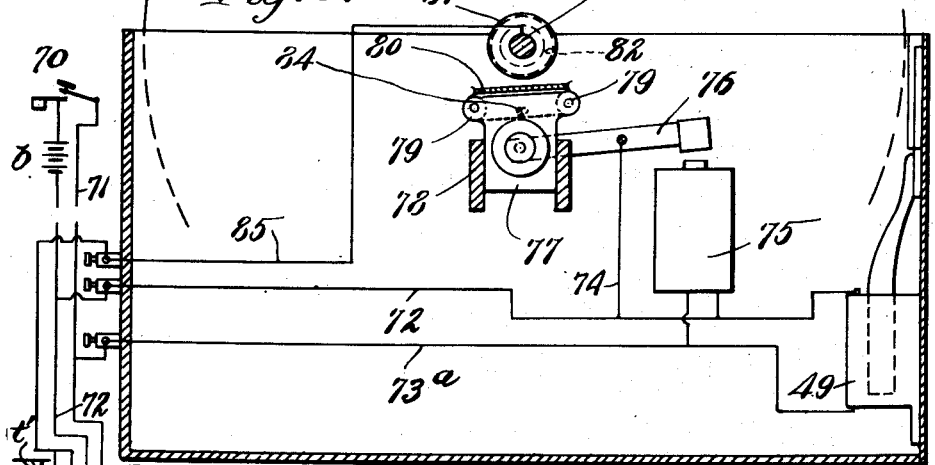
Fig. 8.
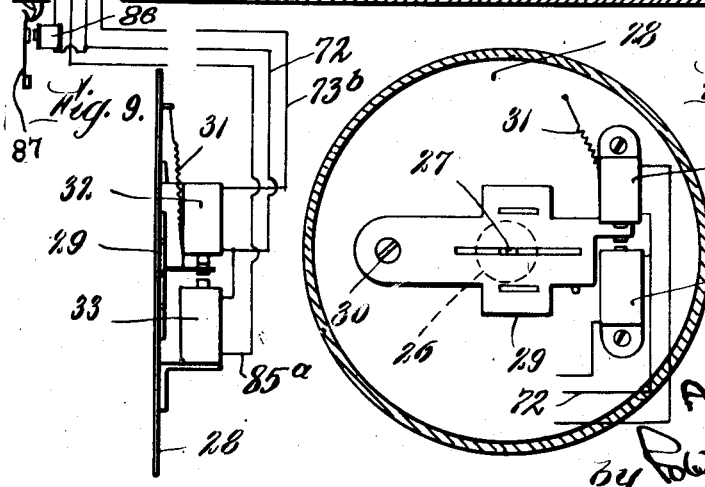
Fig. 9.
Fig. 10.
Inventor:
Arthur Gordon Webster,
by Roberts, Roberts & Anderson
his Attys.

April 8, 1924.
A. G. WEBSTER
1,489,566
OBSERVING AND RECORDING THE OPERATION OF ORDNANCE
Filed April 7, 1919   4 Sheets-Sheet 4
Fig. 12
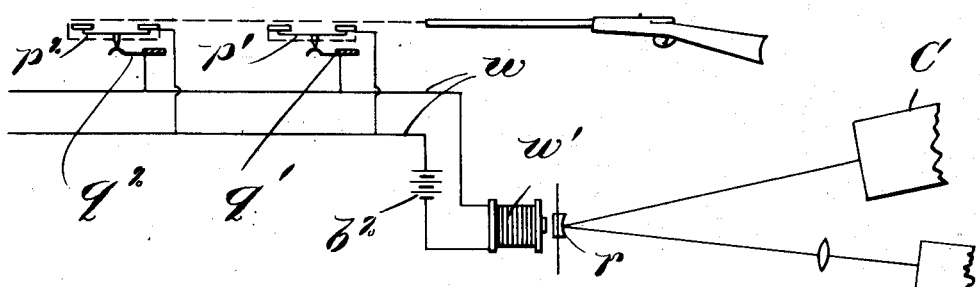
Fig. 11
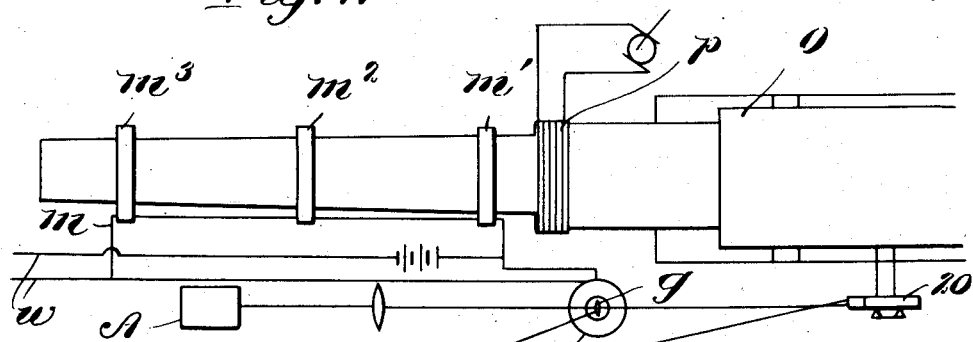
Fig. 13
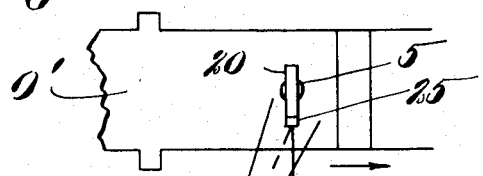
Fig. 14
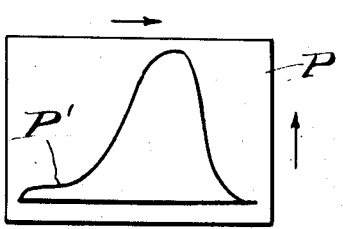
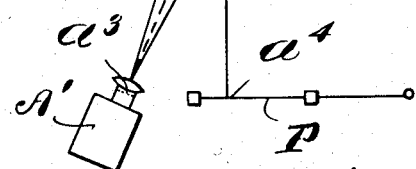
Fig. 15
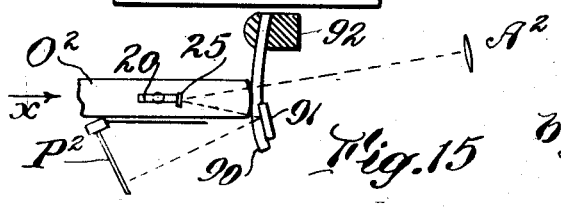
Inventor:
Arthur Gordon Webster
by Roberts, Roberts & Cushman
his att'ys.

Patented Apr. 8, 1924.

1,489,566

UNITED STATES PATENT OFFICE.

ARTHUR GORDON WEBSTER, OF WORCESTER, MASSACHUSETTS; ARTHUR GORDON WEBSTER, JR., AND ELIZABETH MUNROE TOWNSEND WEBSTER EXECUTORS OF SAID ARTHUR GORDON WEBSTER, DECEASED.

OBSERVING AND RECORDING THE OPERATION OF ORDNANCE.

Application filed April 7, 1919. Serial No. 288,188.

*To all whom it may concern:*

Be it known that I, ARTHUR GORDON WEBSTER, a citizen of the United States of America, and resident of Worcester, in the county of Worcester and State of Massachusetts, have invented new and useful Improvements in Observing and Recording the Operation of Ordnance, of which the following is a specification.

This invention relates primarily to quantitative observation and record of sudden pressures, such as caused by exploding charges, and of the consequent behavior of projectiles or driven masses in ordnance and in other fluid-pressure actuated apparatus.

So far as I am aware, prior devices provide neither measuring nor recording means adapted to observe with approximate accuracy the consecutive pressures or the time of the explosion of an explosive charge; nor means to relate the times to the pressures, nor to the movements of the projectile in guns or small-calibre firearms. For use with other apparatus than ordnance in which the active force is a high fluid-pressure suddenly developed, as by firing an explosive charge, I am aware of no successful means for measuring or recording the pressures, movements and other facts of operation.

I am aware of the historical researches of Sir Andrew Noble and the apparatus devised by him for the approximate calibration of the actual operative qualities of an explosive charge. The devices involved in these researches comprised a lateral bore into the explosion-chamber of the piece of ordnance, a plunger fitting in this bore, a gas-check to prevent leakage of the exploding gases around the plunger, an abutment related to the breech of the gun; and a soft metal shape (usually a copper cylinder) adapted to be placed between the plunger and the abutment, so that when the gun was fired the extent to which the copper cylinder or other shape was deformed by the force of the explosion could be utilized as a measure, by comparison with the deformation of a similar shape under a known pressure, to approximately record the maximum pressure created in the explosion chamber. It will be observed that this method of arriving at what happens within the gun when it is fired is devoid of any means for determining the times of the happening, and of any means for relating the relative times with respect to the explosion to the relative pressures created by the explosion. So far as I am aware, these relations of exploding charges have not heretofore been measured, except as integrated by their ballistic effect upon the projectile. Determinations of the time and pressure factors of an exploding charge have heretofore been empirical.

The prime object of this invention is to provide a method of and apparatus for determining with approximate accuracy the pressures of explosion in the explosion chamber of pieces of ordnance or other high-pressure-actuated motors; to observe successively or continuously with the aid of suitable apparatus the successive pressures during the time of their occurrence, and preferably to coordinate these observations in a record which shall either originally be produced as or be capable of being plotted as a curve, having ordinates related to pressures, and abscissæ related to time.

A further object of the invention is to provide means for and a method of observing, concomitantly with the observation of the pressures within a firearm, the movements of the projectile before or after (or before and after) it has left the firearm; and another object is to provide means for preserving records relating together these functionings of the piece of ordnance. Practice of the method and use of the apparatus may thus produce upon a single chronographic record traces or curves, preferably photographic, which can be read to indicate all of the factors of time, pressure and movement of the projectile both within and exterior to the piece of ordnance. In the accompanying drawings I illustrate preferred forms of apparatus by way of explanation of types of apparatus belonging to the genus which is my invention, but it will be understood that practice of the method of observation is independent of any particular form of the apparatus and that the particular forms of apparatus illustrated are instances only of other variant forms which may in some cases be employed.

In the drawings,

Figure 1 is a diagram plan view illustrating one general arrangement of apparatus adapted to record the pressures and times of the explosion in a firearm;

Figure 2 is a diagram illustrating a typical record made by the apparatus illustrated in Fig. 1;

Figure 3 is a breech view partly in section of the piece of ordnance equipped for mensuration of the explosion-pressure and time factors;

Figure 4 is a fragmentary side elevation of the apparatus shown in Fig. 1;

Figure 5 is a detail elevation of the shutter employed on a camera forming part of the apparatus;

Figure 6 is a side elevation, partly in section, of the device as shown in Fig. 5;

Figure 7 is a plan view with the top removed of a recording chronometric camera;

Figure 8 is a section on the line 8—8 of Fig. 7;

Figure 9 is a side elevation of a shutter employed at the source of a light beam;

Figure 10 is a front elevation of the device shown in Fig. 9;

Figure 11 is a plan illustrating in diagram the equipment of a large gun for the comparative record of the times and pressures in the explosion chamber and the motion within the gun of a projectile;

Figure 12 is a similar diagram illustrating apparatus adapted to be employed beyond the muzzle of a gun to record the passage of the projectile at measured distances from the gun;

Figure 13 is an illustration in diagram of one way of recording the work done by the explosion;

Figure 14 is a diagrammatic view of a record produced by the means illustrated in Fig. 9; and Figure 15 is a diagrammatic plan of modified apparatus for recording the work done by the explosion.

Referring now to Figs. 1 to 4, I prefer to use the plunger and gas-check of Sir Andrew Noble's apparatus as a primary responder to the high pressures sought to be measured, and therefore provide the test arm 1 with a transverse bore 2 of known area having therein a plunger 3 and a suitable gas-check 4. The plunger terminates in a rounded hardened head 5.

In order to provide an abutment against which the motion of the rounded head 5 of the plunger 3 can be read, I prefer to provide a heavy clamp 7 (Figs. 1, 3 and 4), comprising a strong frame bored out for the breech of the firearm having a yoke bored and threaded at 8 to receive a heavy screw 9 ending in a bearing-point made as a surface of revolution, preferably of the frusto-conical form shown at 10, upon which is fitted to turn a strong hardened steel cap 11 having a handle 12 by which it can be rotated to adjust the angular position of a pressure-indicator received between the cap 11 and plunger 3, 5.

Whatever the form of the abutment 11 its under surface terminates in two bearings 14, 15, at a standard distance apart, for instance 25 mm. Preferably as shown in Figs. 3 and 4 these bearings are knife-edges formed by the cusps of a concave parallel-sided cut or channel 16, see Figs. 3 and 4, made transversely of the abutment 11. In order to facilitate hardening, the structure 14, 15, may be made separately from the structure 11 and subsequently attached to it, but it will be understood that the joint, if any, is of large transverse area and close contact, so that the behavior of the abutment 11, 14, 15, under the high pressures developed is that of a solid body.

The transverse channel 16, the edges of the bottom of which form the knife-edge bearings 14, 15, is central upon the axis of screw 9 which in turn is co-axial with bore 2 and plunger 3.

In the prior apparatus above mentioned the relative motions of such a plunger as the plunger 3 with respect to such an abutment as the screw 9 were indicated by the extent of permanent deformity of a body placed between them to be crushed.

I have discarded this approximate record of what happens when the explosion takes place in favor of directly observing the deformation of a resilient indicator bar interposed between the plunger and the abutment. For purposes presently to be explained the preferred instrument is a rectangular tempered steel bar spring 20, for instance, which I find can be prepared to give highly constant flexures under given displacements of the plunger 3. A steel bar, for instance 30 mm. long and 6 by 3 mm. cross section, of high-carbon or alloyed tool steel, carefully spring-tempered, is capable of considerable deformation from its original shape under great pressures without passing its elastic limit. Bending of such a spring under lateral stress through moderate angles of flexure is so nearly directly proportional to the stress upon it as to enable a measure of the flexure to serve all practical purposes for an indication and quantitative measure of the stress tending to deform it. This is especially true when the resistance of the spring bar 20 to deformity is so great, in respect to the stresses allowed to act upon it to deform it, as to cause a very small change in the figure of the spring bar 20 throughout the entire range of stresses to be observed.

Such a short steel spring as the bar 20 will, then, if its deflections can be observed under the impact of the plunger 3 as induced by explosion pressure in the firearm, serve as a relatively exact measure of these explosion pressures, easily rendered quantitative by measuring the flexure of the bar 20 under static and known stresses. As compared with the forces under observation, the inertias of the plunger 2 and of the bar 20 are negligibly small and relatively constant. The system comprising the two separated edge bearings 14, 15, and an explosion-pressure actuated plunger acting centrally between these bearings upon a spring free for rotation under flexure upon point 15 and the head 5 of the plunger, is an effective instrument to indicate by the extent to which the spring bends the pressure actuating the plunger. It remains to provide for observing the degree of flexure of the spring 20.

Having regard for the conditions of the observation, mechanical multiplication of the motions of the bar 20 is not reliable. The shock of the explosion is inevitably communicated to the observation apparatus, however massive it may be. However strongly the firearm may be fastened upon a heavy metal base or masonry pier, as in practice I prefer to fasten it, there will still be a proper motion of the entire apparatus along the line of fire under the shock and recoil of the explosion. I therefore prefer to observe the flexure of the spring 20 optically and to record its displacements photographically.

I may form one end of the indicator bar spring 20 as a polished optical surface, preferably a concave of long radius, but in practice it is expedient to cement upon the end of the bar a small glass or speculum-metal concave mirror 25. Flexure of the spring can then be observed by the change in the angular position of the mirror 25.

We may for purposes of mensuration reduce the system 14, 20, 15, to a lever having a length 15, 5, i. e., half the length of the spring between its bearings. Moving upon the point 15 as a fulcrum, the deflection of the spring is then measured by the central displacement of this spring in terms of a radius one-half of the length 14, 15. It will be evident that this lever arm is short as compared with any selected length of a beam of light reflected from the mirror 25, and that a minute deflection of the spring will cause a substantial change in the angular position of the mirror 25. This change in the angular position of the mirror 25 can be arranged to be observed with reduction of any error due to vibratory or proper motion of the apparatus in line with the bore of the gun by the expedient of arranging the spring 20 parallel with the bore of the gun. This is the preferred position, and as illustrated in Fig. 1 preferably the firearm lies upon its side, or so that the bore 2 is horizontal. With this arrangement the light to be reflected by the mirror 25, and the apparatus for photographically recording the motions of the mirror 25, if employed, may be located substantially in or at narrow angles from the line of fire of the firearm and behind the same. Under these circumstances there will be virtually no effective angular displacement of the mirror 25 due to vibrations in the line of fire.

Preferred means for observing or recording the angular motions of the mirror 25 under the stress of an explosion in the firearm are shown in Figs. 1 and 5 to 10. These comprise broadly a source of a powerful directed beam of light such as a focusing arc lamp A of any usual construction, a collimator lens L, and a chronometric recording camera C. In case it is not desired to preserve a record of the behavior of the firearm, the device C may be replaced by an ordinary observation screen.

The optical system involved, as will now be apparent, comprises a source of light at A collimated at L and directed upon the mirror 25 which in turn forms a focussed image of the light source at the point a. The point a may be upon the surface of a sensitized film, photographic plate, or light-sensitive paper F, Fig. 2, moving at an angle to the expected direction of deflection of the image a when the mirror 25 is moved about the vertical axis defined by the abutment bearing 15, and the deflection of the spring 20 may therefore be read by the record t of the lateral deflection of the image a if the distance a, 25 is known. Preferably this distance is the focal length of the concave mirror 25, for the sake of a sharp image at a, and may be from 100 to 1000 times the distance 5, 15.

Detail of the apparatus suggested is important to its succesful use.

While I may use any form of focusing arc at A, I find that it tends to simplicity to avoid the usual arrangements for a point-source of light and to employ instead a refractory screen 26, Figs. 1 and 10, of tungsten, platinum or other refractory metal having therein a pin hole 27 in front of the cathode crater of the arc lamp. By making screen 26 of refractory metal it can be placed so close to the source of light as to leave hole 27 in line between the brightest parts of the arc and the mirror 25 despite the usual wandering of the arc. In front of the screen 26 I employ a heat-insulating screen 28 and upon this mount a shutter 29 pivoted on a shoulder screw at 30, counterbalanced by a light spring 31, and adapted to be held in the open position shown in Fig. 10 by an electromagnet 32, and to be closed by an electromagnet 33, each mounted on the front of the screen 28.

For purposes of record the virtual optical arm 25, *a*, of which the end *a* (the image formed of the pin hole 27) moves laterally upon pressure applied to the plunger 3, and is employed to make a mark upon moving film in the chronographic camera C. In the preferred form shown a light and well-balanced drum 40 is arranged to be rotated at relatively high speeds in a light tight box 41, the only exposure of film being at a slit 42, Fig. 6, arranged to be covered and uncovered by shutter 43, Figs. 5 and 6. The shutter, as shown, may comprise a light metal member moving freely in guides 44, and normally in its upward closed position as determined by a light spring 45 acting through a lever 46 pivoted on the inner side of the camera box 41 and bearing on a pin 47 on the armature 48 adapted to a solenoid 49, by energizing which the shutter 43 can be opened and held open. Preferably the drum 40 rotates with its axis 50, which may be mounted in ball bearings as indicated, the axis 50 being provided with a pulley 51 outside of the box for driving by a constant speed electric motor, not shown, which may act directly on the shaft, or through a driving belt 52. A length of sensitive film or paper F is stretched about and held on the surface of the drum 40 by any suitable clamp means, for instance of the type having an internal element actuated by centrifugal force.

I may rely for indication of elapsed time upon a standardized speed for the peripheral surface of the drum 40, which may for instance have a surface 1 m. in circumference and 10 cm. in width, and rotate at 1800 to 2000 revolutions per minute, but I prefer to relate the coordinates of the curve traced upon its surface to a standard measure of time. This may comprise a record written on the film by the exposure of any part of the surface of the film at sufficiently short intervals to a separate source of light, or it may comprise an interruption or deflection of the beam of light from the source A by a vibratory interrupter or deflector interposed in the beam, but I prefer the arrangement illustrated in Fig. 1 at V, comprising a fixed base 55, an electromagnet 56, a vibratory reed 57 of magnetic material upon which is mounted a small concave mirror 58, and circuit connections to the magnet 56 arranged to be broken upon motion toward the magnet of the reed 57. This device, a mere variation of the familiar electric buzzer, I find to be well adapted, by the use of a short, stiff reed 57, to maintain a continuous vibration of constant high pitch. The pitch of the reed 57 may be found by comparison with a tuning fork, or pipe of standard pitch.

A speed governor for the motor or drum 40 of any desired type may be provided.

It will be understood that a beam of light reflected from the mirror 58 will have a lateral vibration of considerable amplitude corresponding to the known rate of the reed 57. Conveniently the vibrator V is mounted to reflect light from the source A, for instance by placing it in the collimated beam behind the lens; and the mirror 58 is adjusted by turning the base 55 to bring the reflected spot of light within slit 42 and on the traveling film in the camera C whenever the shutter 43 is open. So long as the device V is actuated the film will bear a sine-curve mark such as illustrated at *v*, Fig. 2, whenever the shutters at the source of light A and the camera C are open. The distances apart of like phases of sine-curve *v* furnish a scale independent of the rate of motion of the film for comparison of the rate of vibration of the reed 57 with the time-indicating abscissæ of any curves marked on the film, such as those inscribed by movement of the image *a* in the ordinate direction as a consequence of motion of the mirror 25 under pressure.

In order to prevent fogging the film on the drum 40 I prefer to arrange for controlling the shutter 43 to open before the charge is fired and to arrange for opening the light shutter during one revolution only of the drum 40, in time with the occurrence of the explosion at a measured time after initiating the explosion and then to close the light shutter automatically.

Referring now to Figs. 1 and 7 to 10, one arrangement for this purpose comprises a switch 70 controlling a circuit 71, 72, 85, source of energy *b*, magnet 86, and armature 87 for pulling the trigger *t'* of the firearm, the circuit 71, 72, having branches 73$^a$, 73$^b$, for operating the respective magnets 49 for automatically opening the camera shutter 43, and 33 for closing the light shutter 29 at the source of light A when the contact at 70 is closed.

Within the camera box C an electromagnet 75 is bridged across the circuit 72, 73$^a$, and arranged to depress one end of a lever 76 carrying on the other end a vertical slide 77 in ways 78 beneath one of the bearings for the shaft 50, whenever the camera shutter 43 is opened by energizing circuit 72, 73$^a$.

The slide 77 carries transverse ways 79, 79, upon which a straight conductor 80 is arranged to slide in a direction parallel to the axis 50 against a light spring 84 tending to pull the conductor 80 away from drum 40. Conductor 80 is connected through a wire 74 to the common wire 72 of the circuits.

The axis 50 has fixed upon it a worm 81 of insulating material, upon which at 82 one pitch of the screw-thread on the surface of the worm is formed of or lined with a conductor 82 connected at 82ª, or in contact with, the shaft 50. The worm ends in an annular groove 83. Shaft 50 is connected through one of its bearings to a conductor 85 leading through the magnet 32 for opening the light shutter to the common wire 72 as shown.

Whenever the magnet 75 is energized the conductor 80 is moved against the under surface of the worm 81 and slides under the action of the screw-threads on the worm 81 during the time measured by the speed of shaft 50 and initial position of conductor 80 into contact with the conductor 82, which contact is maintained for one revolution only of the drum, when the conductor 80 runs out of contact with the conductor 82 and into groove 83. The light shutter 29 can thus open only when the magnet 32 is energized by contact between conductor 80 and worm-segment 82. Magnet 32 is more powerful than magnet 33, and is operative although the switch 70 remains closed. When the switch 70 is released the weight of the slide 77 withdraws the conductor 80 from the groove 83, and the slide 80 returns to its original position under the influence of spring 84.

The result of closing switch 70 is thus first to open the camera-shutter, then to initiate the firing of the charge, and then to open the light-shutter 29 during one revolution only of the drum 40.

I am enabled by these devices to receive the indication of the explosion on a sensitive surface running at a very high speed, and to protect the photographic record from unintentional duplication of any of the indications to be made upon it.

The operation of the device as above described serves to mark upon the film F, Fig. 2, the indications of pressure and time of explosion as shown in said figure. It is within my invention also to mark upon the same film the relative time of passage of the projectile either within or beyond the bore of the firearm.

Referring now to Fig. 11, the pressure indicating bar shown at 20 may be employed with the source of light A and the camera C as before, but in this case a galvanometer G of any sensitive-reflecting type or a string galvanometer is arranged so that its mirror $g$ reflects (or interrupts) a beam, conveniently a part of the beam of light from the source A, into the slit 42 of the recording camera. On the barrel of the piece of ordnance O a primary coil $p$ excited from a suitable source $d$ of direct current is arranged. The coil $p$ may be upon any part of the barrel of the gun O. In series with the galvanometer in circuit $m$ any desired number of relatively thin coils $m'$, $m^2$, $m^3$ of a considerable number of turns of relatively fine wire may be placed at any desired intervals along the barrel of the gun.

The projectile is conducting and in a large gun magnetic. I find that even in the case of service small-arms the nickel-alloy sheath of the bullet is effective at passage beneath the coils $m'$, $m^2$, $m^3$, to so alter the magnetic circuit composed by the projectile and the magnetized barrel of the gun O as to cause a perceptible current to flow in the circuit $m$ when the bullet passes beneath each of the coils $m'$, $m^2$, $m^3$. The mirror or string $g$ of the galvanometer G is thereby deflected as the projectile passes each of these coils in succession, and the trace as shown at $y$, Fig. 2, left by its reflection on the film F is related to the times and pressure of the explosion recorded by the deflections of the bar 20 in the manner desired. Since measurement is from like phase to like phase of the curve traced by the galvanometer, times of the passage of the projectile are very accurately recorded.

Any existing arrangement may be used for marking upon the same film the times of passage of the free projectile after it leaves the gun; but I prefer and have illustrated in Fig. 12 apparatus comprising acoustically or air-wave operated diaphragms $p'$ and $p^2$, in a series of any desired number and distance apart arranged at one side of the flight of the bullet or projectile, and adapted to be acoustically affected by the passage in front of them of the projectile. When, as is usually the case in the proving-room or proving-ground testing of ordnance, the line of flight of the projectile is accurately known, so that the series of devices $p'$, $p^2$, can be arranged approximately equidistant from the line of flight of the projectile, the sensitiveness of the measurement of the times of passage secured by reliance upon the acoustic disturbances initiated in flight by the projectile exceeds that of the usual broken-wire screens or other devices for timing the passage of a projectile heretofore in use. Preferably the acoustically operated devices are of the type of apparatus invented by me known as the phonometer, the diaphragms being rigid disks mounted upon a system of oppositely strained vibrating tension wires or strings, and preferably associated with a resonator (not shown). For the present use the phonometer disks are arranged to make and break contact with electrodes $q'$, $q^2$, etc., at each station, upon occurrence of vibrations of high amplitude of the respective diaphragms $p'$, $p^2$, etc. The devices $p'$, $q'$, may be connected in parallel with a line wire W containing a source of energy $b^2$ and an electro-magnet $w'$ arranged to swing a concave reflector $r$ in the beam of light from the film A, and forming an image within the slit 42 of the camera C. Or I may employ unchanged the galvanometer G, Fig. 11, by arranging to include it in the circuit W, $p'$, $p^2$, etc., as indicated.

As another feature of my invention I may utilize the bar 20 and the abutment 11 for directly recording the work done by the explosion, in a manner analogous to making an indicator diagram of any fluid-pressure motor.

Referring to Fig. 13, a pressure-indicator bar 20 and mirror 25 as above described is arranged transversely of a piece of ordnance O' mounted to recoil in the direction of the arrow X, the mirror 25 being positioned to traverse a beam of light from a fixed projector A'. The explosion pressures cause an image from a diaphragm or artificial star $a^3$, at A, to be formed at $a^4$ on screen P and to be displaced vertically as function of the pressure. But under recoil of the gun the mirror 25 moves to the right, and the angle $a^3$, 25, $a^4$, increases in magnitude. The spot $a^4$ therefore moves on the screen P on which it is received by a multiple of the distance of recoil.

Under these circumstances a fixed photographic plate exposed at P will show a curve traced by image $a^4$ as illustrated [inverted] at P' in Fig. 14, of which the ordinates are functions of pressure and the abscissæ proportional to the motion of the gun under recoil. The relative masses and resistance to recoil being known, the area of the curve is a measure of the energy developed in the gun, easily read by the application of the formula calculated from the masses and resistances concerned in the motion of recoil of the gun and the instrumental constants of the pressure-sensitive recording element.

Fig. 15 illustrates a modification of the apparatus shown in Fig. 13 in which use is made of spring-bar indicators respectively to measure the pressure and the work done by the explosion. The piece of ordnance, for instance, a small-bore fire-arm $O^2$, is arranged to recoil freely in direction $x$ except as restrained by a spring 90, the deformation of which is proportional to the force of the recoil. This spring may, as shown, be a bar of steel mounted in a heavy fixed abutment 92, and equipped with means for observing the work of the explosion occasioning recoil, as measured by the deformation of spring 90. A convenient arrangement for this adapted to leave a trace such as shown in Fig. 14 comprises a mirror 91 mounted on spring 90 to receive and horizontally deflect, according to the flexure of spring 90, a beam of light vertically deflected by the mirror 25 of the indicator 20 according to the pressure.

The image of an artificial star at $A^2$ formed by mirror 25 as reflected from mirror 91, is formed upon a photographic plate $P^2$, and upon firing the firearm $O^2$ the successive coordinate positions of the mirrors 25, 91, are indicated by the trace left on the plate by the image.

The apparatus and method outlined above may conveniently be employed for the comparative study of any component of the charge, the projectile or the operative quantities of ordnance. I have successfully employed it for the study of variations in service charges in fixed ammunition and for investigating the relations of the explosive charge to the trajectories and speeds of projectiles.

For the mere acceptance or other test measurement of samples of fixed ammunition, it is often unnecessary to discover more of the behavior of the exploding sample charge than its maximum pressure, and for this purpose I prefer to operate the drum 40 of the recording camera step by step, recording at each step the maximum deflection of the indicator bar 20 on the stationary film from a charge fired. Mere inspection of a strip of film containing a series of those records serves to show quantitatively variations from ballistic effects of a sample, and the occurrence or absence of abnormal specimens among the test samples.

I claim:

1. Apparatus for observing the operation of ordnance comprising movable parts consisting of a plunger acted upon by the explosion pressure in a firearm and a very stiff bar to be flexed by the plunger, and comprising means for observing movements of the bar, the inertia of said movable parts being negligible as compared with the forces under observation.

2. Apparatus for observing and recording the operation of ordnance comprising a movable member acted upon by the explosive pressure in a firearm, a very stiff spring to be flexed by said movable member and means for observing flexing movement of the spring, the degree of flexure of the spring resulting from an explosion being well within the elastic limit of the spring and very approximately a linear function of the pressure.

3. The art of measuring suddenly changing fluid pressures in a closed chamber such as the explosion chamber of ordnance comprising photographically recording at different times during the changes in pressure the degree of flexure of a spring acted upon to be flexed by the pressure, the degree of flexure measured being well within the elastic limit of the spring and approximately an unvarying function of the pressure recording mark upon it.

4. The art of determining the operation of pieces of ordnance comprising chronographically recording both the changes in pressure within the piece of ordnance during the explosion of a propulsive charge and the times of passage at separated points of a projectile driven by the explosion.

5. The art of determining the operation of pieces of ordnance comprising photographically recording on a surface moving at a known rate both the changes in pressure within the piece of ordnance during the explosion of a propulsive charge, and the times of passage at separated points of a projectile driven by the explosion.

6. The art of determining the operation of pieces of ordnance comprising chronographically recording the changes of pressure within the piece of ordnance during the explosion of a propulsive charge, and the times of passage of a projectile driven thereby at points within and without the piece of ordnance.

7. The art of proving the operation of a firearm comprising recording the times and pressures of the explosion and the passage at distant points of the projectile in flight.

8. Apparatus for observing suddenly changing fluid pressures of high intensity having therein a resilient indicator adapted to resist deformation approaching its elastic limit by the expected pressure, said indicator comprising means for altering the path of a beam of light movable in response to flexure of the indicator.

9. Apparatus for observing suddenly changing fluid pressures of high intensities having therein an indicator bar arranged to be bent to an extent materially short of its elastic limit by pressures of the expected intensity the pressure against the known impeding force of its own resilience, said indicator comprising means for altering the path of a beam of light movable in response to the flexure of the indicator bar.

10. Apparatus for measuring suddenly changing fluid pressures comprising a resilient indicator arranged to be flexed well within its elastic limit by the pressure acting against the known impeding force represented by the resilience of the indicator, and means for recording displacements of the indicator operative without intrinsic vibration of the recording means comprising an optical surface rigidly attached to the indicator.

11. Apparatus for measuring suddenly changing fluid pressures comprising a resilient indicator bar arranged to be flexed by the pressure against its known resistance to deformation, and photographic means for recording changes in the position of said indicator including a reflector attached to the indicator bar at an angle to the direction of the flexing force.

12. Apparatus for measuring high fluid pressures in a chamber having therein a bore communicating with the chamber, a plunger in the bore, an abutment fixed relatively to the chamber, a resilient indicator between plunger and abutment adapted to be moved in response to pressure acting upon the plunger, and means for recording the extent of motion of the indicator.

13. Means for measuring high fluid pressures having therein a resilient bar, pressure-responsive means for bending the bar through slight angles, and optical means for denoting the extent of such bending.

14. Means for measuring high fluid pressures having therein a resilient bar, pressure-responsive means for bending the bar comprising separated bearings for the bar supporting it against the thrust of a part actuated by the fluid-pressure, and means on the bar whereby to change the direction of a beam of light proportionally to the bending of the bar.

15. Apparatus for measuring suddenly changing fluid pressures comprising a bar arranged to be bent in response to change in pressure, and light-deflecting means attached to the bar for optically denoting the extent of bending of the bar.

16. In apparatus for the purpose described, the combination with a pressure-actuated plunger of an abutment having separated bearings at each side of the line of motion of the plunger, a bar-spring on said bearings in contact with said plunger, and means for denoting the deflection of said spring under pressures applied to the plunger.

17. Apparatus of the character described comprising a firearm having a cartridge chamber with an opening communicating directly with the side wall of the cartridge case, a plunger movable in said opening, a light reflecting member operated by said plunger, and means for recording the vibration of the reflecting member, the inertia of the plunger and reflecting member being negligible as compared with the forces under observation.

18. Apparatus for measuring suddenly changing fluid pressures comprising means for shifting the position of a beam of light in response to changes in pressure, and a camera adapted to move a light-sensitive surface in a direction at an angle to the direction in which the beam is shifted.

19. Apparatus for use in recording the operation of ordnance comprising a camera, means movable consequently upon the effect of an exploding charge for shifting a beam of light in respect to the sensitive surface of the camera, and vibratory means adapted to impress upon the sensitive surface in the camera a scale for measuring the relative times of the effects of the explosion by comparison with the mark or trace left by said beam.

20. Apparatus for recording sudden operations such as the explosion of a charge in a piece of ordnance comprising an optical system arranged to be disturbed by the operation to be recorded, a chronographic camera having an endless carrier for a light-sensitive surface and means for driving said carrier, and means for exposing said surface to a trace-marking beam of light controlled by said optical system when the operation is about to occur, and for automatically limiting the duration of such exposure.

21. In apparatus for recording the operation of ordnance, the combination of a source of light, a chronographic camera, shutters for the camera and for the source of light, and means adapted to open the camera shutter and open the light shutter in the order named.

22. A chronographic camera for use in apparatus for recording operations occurring in rapid succession and during a short interval of time, comprising an endless carrier for a photographically sensitive surface, means to drive the carrier, an optical system controlled by the operation to be recorded comprising a source of light for marking a trace on the surface, a shutter between the source of light and the sensitive surface, and means for controlling said shutter adapted to limit the open position of said shutter to a definite extent of motion of the sensitive surface.

23. In apparatus for recording the operation of ordnance, the combination of chronographic recording means with pressure-sensitive devices for tracing a record of the pressures and times developed within the ordnance, and means for recording upon the chronograph record the times of passage of a projectile at points distributed along the path taken by the projectile.

24. Means for recording the operation of ordnance comprising means for recording the pressures developed and the times at which they are developed, and electromagnetic means associated with the barrel of the piece of ordnance for independently recording the times of passage of the projectile in relation to the time of explosion.

25. Means for recording the passage of a projectile in the barrel of a firearm comprising means for magnetizing the barrel, insulated conductor coils surrounding the barrel at intervals, current-sensitive means for indicating the flow of current occasioned by passage of the projectile at the coils in circuit with the respective coils, and means for chronographically recording the indications of said current-sensitive means.

26. Apparatus for recording the flight of a projectile fired from a firearm comprising a plurality of acoustically sensitive circuit-changing devices distributed along the line of flight of the projectile, and current-sensitive means in circuit with said acoustically sensitive devices adapted to record the circuit-changes produced by the acoustical disturbance of the respective devices at passage of the projectile.

27. Means for timing the flight of projectiles comprising a series of phonometers, and an electrical circuit comprising contacts adapted to be closed by vibrations of large amplitudes at said respective phonometers and including an electrically sensitive device for recording the times of the current disturbances in said circuit.

28. Apparatus for recording the operation of a firearm comprising an explosion-pressure controlled light-deflecting indicator, a light-sensitive surface, and means to expose said surface to a beam of light deflected to different parts thereof according to different positions of said indicator.

29. Apparatus for recording the operation of a firearm comprising an explosion-pressure controlled light-deflecting indicator, a recoil-operated indicator, a light-sensitive surface, and means to expose said surface to a beam of light deflected to different parts thereof according to different positions of each of said indicators.

30. Means for graphically recording the pressure and the work done in a piece of ordnance at coordinate times comprising light-deflecting means arranged to shift the position of a beam of light in one dimension according to the pressure, and in another dimension according to the extent of recoil against a known retarding force, and a light-sensitive surface adapted to record the successive coordinate positions of the beam of light.

Signed by me at Boston, Massachusetts, this 31st day of March, 1919.

ARTHUR GORDON WEBSTER.